US010047792B2

(12) United States Patent
Guettler et al.

(10) Patent No.: US 10,047,792 B2
(45) Date of Patent: Aug. 14, 2018

(54) PLANETARY GEAR BEARING ARRANGEMENT

(71) Applicant: Schaeffler Technologies AG & Co. KG, Herzogenaurach (DE)

(72) Inventors: Alexander Guettler, Wiesenttal (DE); Michael Plogmann, Herzogenaurach (DE); Christian Forstner, Schweinfurt (DE); Sven Claus, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/030,411

(22) PCT Filed: Aug. 20, 2014

(86) PCT No.: PCT/DE2014/200409
§ 371 (c)(1),
(2) Date: Aug. 1, 2016

(87) PCT Pub. No.: WO2015/058749
PCT Pub. Date: Apr. 30, 2015

(65) Prior Publication Data
US 2016/0341248 A1  Nov. 24, 2016

(30) Foreign Application Priority Data
Oct. 21, 2013 (DE) .......................... 10 2013 221 265

(51) Int. Cl.
*F16C 33/10* (2006.01)
*F16C 17/02* (2006.01)
(Continued)

(52) U.S. Cl.
CPC .......... *F16C 33/1055* (2013.01); *F16C 17/02* (2013.01); *F16C 23/041* (2013.01); *F16C 33/046* (2013.01); *F03D 15/00* (2016.05); *F05B 2240/50* (2013.01); *F05B 2260/40311* (2013.01); *F16C 17/04* (2013.01); *F16C 2223/10* (2013.01);
(Continued)

(58) Field of Classification Search
CPC ..... F16C 33/04; F16C 33/043; F16C 2361/61
See application file for complete search history.

(56) References Cited

U.S. PATENT DOCUMENTS 4,325,589 A * 4/1982 Hirt .......................... F16C 17/02
384/375
5,102,379 A   4/1992 Pagluica et al.
(Continued)

FOREIGN PATENT DOCUMENTS

AT      509624 A1   10/2011
CN     103185132    7/2013
(Continued)

*Primary Examiner* — Alan B Waits
(74) *Attorney, Agent, or Firm* — Davidson, Davidson & Kappel, LLC

(57) ABSTRACT

A planetary gear bearing arrangement, including a planet carrier provided with a fixed bearing axis on which a planet gear is rotatably mounted via a sliding bearing that has a first antifriction layer on the axis side and a second antifriction layer on the gear side, wherein one of the two antifriction layers (8, 11) is created on a surface (10, 19) which is at least partially domed in the sliding region to reduce the edge pressure.

10 Claims, 5 Drawing Sheets

Figure 1:
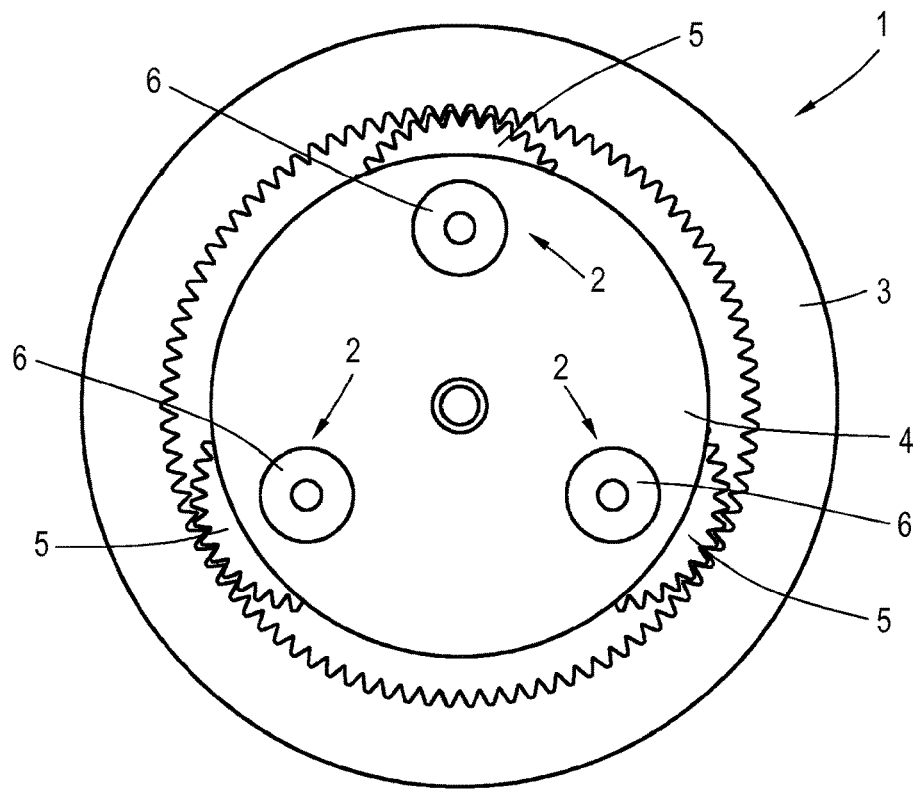

(51) Int. Cl.
*F16C 33/04* (2006.01)
*F16C 23/04* (2006.01)
*F16H 57/08* (2006.01)
*F03D 15/00* (2016.01)
*F16C 17/04* (2006.01)

(52) U.S. Cl.
CPC .... *F16C 2361/61* (2013.01); *F16H 2057/085* (2013.01)

(56) References Cited

U.S. PATENT DOCUMENTS

| | | | | |
|---|---|---|---|---|
| 5,188,576 A * | 2/1993 | Maguire | ............. | F16H 57/0479 384/424 |
| 5,209,707 A * | 5/1993 | Teraoka | ............. | F16H 48/285 475/159 |
| 5,368,528 A * | 11/1994 | Farrell | ............. | F16C 19/48 384/424 |
| 5,593,362 A * | 1/1997 | Mizuta | ............. | F16H 57/082 475/348 |
| 5,827,147 A * | 10/1998 | Stewart | ............. | F16C 33/043 384/907.1 |
| 6,145,941 A * | 11/2000 | Anderton | ............. | B62D 55/0887 305/100 |
| 6,702,070 B2 * | 3/2004 | Smith | ............. | B60K 7/0015 188/250 G |
| 7,152,484 B2 * | 12/2006 | Meyer | ............. | F16C 17/24 384/448 |
| 8,119,240 B2 * | 2/2012 | Cooper | ............. | C23C 14/0605 204/192.16 |
| 2,051,915 A1 | 3/2012 | Kazutaka et al. | | |
| 8,425,360 B2 * | 4/2013 | Nishida | ............. | F16C 17/102 475/159 |
| 8,545,102 B2 * | 10/2013 | Hayashi | ............. | F16C 17/02 29/898.043 |
| 8,591,371 B2 * | 11/2013 | Dinter | ............. | F03D 15/00 475/160 |
| 8,790,213 B1 | 7/2014 | Isayama et al. | | |
| 8,840,521 B2 | 9/2014 | Kari et al. | | |
| 9,016,429 B2 * | 4/2015 | Feng | ............. | F16H 57/021 180/339 |
| 9,062,713 B2 * | 6/2015 | Braun | ............. | F16C 32/0629 |
| 9,140,342 B2 * | 9/2015 | Hoebel | ............. | B62M 6/55 |
| 9,419,495 B2 * | 8/2016 | Kari | ............. | F16H 1/28 |
| 9,470,265 B2 * | 10/2016 | Lueck | ............. | F16C 17/02 |
| 9,618,039 B2 * | 4/2017 | Arnold | ............. | F16C 33/04 |
| 2006/0051004 A1 * | 3/2006 | Lee | ............. | F16C 33/043 384/297 |
| 2006/0078239 A1 * | 4/2006 | Dimofte | ............. | F16C 32/0685 384/100 |
| 2007/0223852 A1 * | 9/2007 | Lee | ............. | F16C 33/043 384/297 |
| 2009/0060408 A1 * | 3/2009 | Nagasaka | ............. | C04B 41/009 384/625 |
| 2011/0140448 A1 * | 6/2011 | Takeuchi | ............. | F16H 57/082 290/55 |
| 2012/0177311 A1 * | 7/2012 | Isayama | ............. | F16H 57/082 384/416 |
| 2013/0064646 A1 * | 3/2013 | Frehland | ............. | F01D 3/025 415/101 |
| 2015/0337949 A1 * | 11/2015 | Ziegler | ............. | C10M 107/38 475/159 |

FOREIGN PATENT DOCUMENTS

| | | |
|---|---|---|
| DE | 66534 | 4/1969 |
| DE | 289318 | 4/1991 |
| DE | 20023443 | 4/2004 |
| DE | 10318945 | 10/2004 |
| DE | 102004047160 | 4/2006 |
| EP | 2336583 | 6/2011 |
| EP | 2518371 | 10/2012 |
| JP | H08170693 | 7/1996 |
| JP | 2001165151 | 6/2001 |
| JP | 2013139837 | 7/2013 |
| SU | 1090941 | 5/1984 |

\* cited by examiner

US 10,047,792 B2

PLANETARY GEAR BEARING ARRANGEMENT

The present invention relates to a planetary gear bearing system, including a planet carrier, on which a fixed bearing axis is provided, on which a planet wheel is rotatably mounted via a friction bearing, which has a first antifriction layer provided on the axis side and a second antifriction layer provided on the wheel side.

BACKGROUND

A planetary gear bearing system is typically used in a planetary gearset. A planetary gearset of this type typically includes at least one sun wheel, an annulus wheel and a planet carrier, on which at least one planet wheel is rotatably mounted on a bearing axis. The sun wheel drives, for example, the planet wheel, at least multiple, for example three, planet wheels being distributed equidistantly, which are driven together via the sun wheel. The planet wheel(s) mesh(es) with the annulus wheel, so that the corresponding gear ratio occurs.

Methods are known for rotatably mounting the planet wheel on the bearing axis via a friction bearing. Rolling bearings are typically used for mounting. In large planetary gearsets, in particular, the use of a hydrodynamic bearing is known, which is lubricated with the aid of a corresponding lubricant, for example oil. Under high loads and at low relative speeds, the friction partners of the friction bearing move in so-called mixed friction mode. In this case, the rotating friction partner is not completely carried by the intermediate lubricating film, but instead an, at least partial, surface contact exists between the rotating friction partner and the counter-rotating partner.

In general, the friction partner carrying the circumferential load, i.e., generally the rotating shaft, should have a greater hardness, possibly a surface hardness, than the counter-rotating partner. Based on this design, the surface contour of the counter-rotating partner adapts to the contour of the friction partner, which is generally designed as a shaft. After initial run-in wear, this contour adaptation effectuates a reduced wear by reducing the mixed friction portion or shifting of the mixed-friction area toward lower rotational speeds. The run-in phase is absolutely necessary for friction bearings such as those used here. During hydrodynamic operation, however, the one friction partner of the friction bearing is carried entirely by the lubricating film. It is separated from the counter-rotating partner by this lubricating film. Compared to the mixed-friction state, the hydrodynamic state occurs at higher relative speeds (constant pressure) or lower pressures (constant relative speed).

In principle, an operation in the mixed-friction state would be advantageous, since the minimum value of the Stribeck curve is in this range, which describes the curve of the friction force or the friction coefficient as a function of the friction velocity in the case of a hydrodynamic friction. Starting from the minimum value of the Stribeck curve, the friction force increases again at higher friction velocities, due to the increasing intensity of the liquid friction, even if a transition to sliding friction occurs.

The gearing of the planet wheel and the annulus wheel gearing meshing therewith is usually a helical gearing. For this reason, an axial load also acts upon the friction bearing, which induces a tilting moment. This means that an edge pressure occurs in the friction bearing area, which is conducive to wear. This is all the more true since, in known friction bearing systems, one friction partner of the friction bearing material pairing is provided with or includes a surface layer made of white metal or bronze, while the other friction partner of the material pairing has a surface made of unhardened or hardened steel or a hard chrome-plated surface. If an uneven introduction of force occurs, due to operation, and a tilting moment results as a consequence, this stresses, in particular the friction partner made of white metal or bronze, since it is the softer friction partner within the material pairing and is therefore more susceptible to wear. If the planetary gearset has a large design, as is generally the case in gearsets which are used in the area of wind turbines, considerable tilting moments result, which are conducive to wear. In large planetary gearsets, in particular, this is problematic, since a worn bearing component may not be readily replaced, or if this is possible at all, only with a great deal of effort.

SUMMARY OF THE INVENTION

It is an object of the present invention to provide a planetary gear bearing system, which is more resistant to wear, compared to known bearing systems.

To achieve this object, it is provided that, according to the present invention, in a planetary gear bearing system of the type mentioned at the outset, one of the two antifriction layers is produced on a surface having a domed profile, at least in sections, for the purpose of reducing the edge pressure in the sliding area.

The friction bearing according to the present invention, is characterized by a surface having a particularly domed profile in the sliding area, on which one of the two friction layers is produced or provided. The surface has a domed profile, at least in sections, and is therefore slightly recessed at least in the edge area, so that a minimum clearance results there, within which a tilting of the friction partners relative to each other is possible without the edge pressure being increased thereby. This results in the fact that the sliding properties are maintained even if the active antifriction surface, within which the particular sliding state or the active sliding guidance exists, is slightly reduced, due to the edge recess. At the same time, however, a slight tilting without increasing the edge pressure or even reducing the edge pressure and thus without local increase in wear is possible even if axial and/or radial forces are unevenly introduced and a tilting moment results.

One refinement of the present invention, in particular, has a wear-reducing effect, according to which one of the friction layers, in particular the first antifriction layer provided on the bearing axis side, is a deposited hard material layer, and the other antifriction layer, in particular the second antifriction layer on the wheel side, is a hardened surface layer. After all, in known friction bearing systems, one friction partner of the friction bearing material pairing is typically provided with or includes a surface layer made of white metal or bronze, while the other friction partner of the material pairing is a surface made of unhardened or hardened steel or a hard chrome-plated surface. In this material pairing, a frequent operation of the friction bearing in the mixed-friction area, results in an early scooping out of the wear volume, possibly even damage and thus an early failure of the friction bearing, due to the high surface wear on the friction partner made of white metal or bronze. However, the area of the mixed friction described at the outset is traversed by frequently changing, in particular low rotational speeds and high dynamics of the bearing loads, in particular, each time the friction bearing starts and stops. If a planetary gearset is thus used in applications in which a bearing frequently starts, corresponding high bearing loads are present, which are conducive to wear. According to the present invention, a special material pairing is now provided in the friction bearing area. The first antifriction layer is formed by a deposited hard material layer, which is applied, for example, with the aid of PVD or PACVD methods. This hard material layer may be, for example, a diamond-like or diamond-type coating. In particular, it is designed as an amorphous carbon layer, as a so-called DLC layer, or as metal-doped carbon layers. Alternatively to using amorphous carbon layers, the hard material layer may also be manufactured by carbonitriding. In particular, a hard, diamond-type coating having the designation "Triondur®" from the applicant is suitable. These include different layers, for example a nitridic chromium layer, a hydrogen-free, amorphous carbon layer or carbon-based layer systems which are distinguished by extreme wear resistance as well as good oil wetting.

The second material of the tribological system proposed according to the present invention is a hardened surface layer. This material is preferably produced by a corresponding thermal treatment and possibly the introduction of additional, layer-hardening elements, for example carbon and the like, into the surface layer of the particular friction bearing friction partner, which is typically formed as rolling bearing steel or case hardening steel, such as 18CrNiMo7-6. Consequently, two extremely hard friction partners are present in the tribological system according to the present invention, which is made of a hard material layer and a hardened surface layer. Due to the low adhesion tendency of the hard material layer in contact with the hardened surface layer, i.e., the hardened steel layer, a very low coefficient of friction exists under oil lubrication. Consequently, very little friction action occurs during sliding, resulting in little heat development compared to friction bearing systems of a conventional hydrodynamic design, based on bronze and white metal materials. Moreover, the tribological system proposed according to the present invention is characterized by an extremely high wear protection, since both partners within the material pairing are extremely hard and thus wear-resistant. As a result, a very high mixed friction capability results during operation of the friction bearing, combined with the ability to place the operating point near the minimum value of the Stribeck curve, where the optimum ratio between rotational speed and frictional force exists. Even greater proportions of solid body friction may be tolerated without wear, due to the parameters of the participating layers.

Another advantage is that, due to the high wear resistance, the classic run-in no longer occurs in the friction bearing integrated into the planetary gear bearing system according to the present invention. The tribological system does not run in, and a smoothing of roughness peaks takes place to a much lesser degree. This results in a better guide accuracy, the operating friction moment is available from the beginning and does not change in a way that affects the system. This is supported by the preferred setting of the substrate surfaces with roughnesses Rz>1, which applies, in particular, to the hard material layer but also preferably to the hardened surface layer.

If a material pairing of this type is thus used, an extremely wear-free operation results when operating under normal load. If there is an uneven load introduction or tilting of the planet wheel relative to the planet axis, this also does not have a wear-conducive effect, since the surface having a dome profile reduces the edge pressure. Even if there is mixed friction in this case, thus if the friction partners strike each other in the case of slight tilting, no increased wear occurs, since the material pairing counteracts this.

The profiled surface itself may be formed directly on the bearing axis, on a bearing collar which is slighted larger in diameter compared to the rest of the axis diameter, and/or on the planet wheel, on its bore interior. Alternatively, the shaped surface may also be formed on a sleeve situated on the axis side or wheel side, which carries the antifriction layer.

Two or more sleeves situated axially one after the other may be provided, which are spaced a distance apart for the purpose of forming one or multiple lubricant receiving spaces, and/or which include a section having a reduced wall thickness. In this embodiment of the present invention, the friction bearing includes two or multiple parts on at least one bearing half, and it is implemented via two or multiple sleeves situated axially one after the other. This is advantageous, since in the event of a possible deformation of the bearing axis or the planet wheel, the complete friction bearing or the corresponding antifriction layer is not deformed, but instead the bending stress is absorbed due to the sleeve division. Another advantage is the formation of lubricant receiving spaces in the sliding area. This makes it possible to provide corresponding lubricant reservoirs in this area and to be able to keep the friction bearing well lubricated at all times. One special advantage of the material pairing of hard material layer/hardened surface layer described above is that a much lower heat development occurs, compared to previous systems, which goes hand in hand with a much lower cooling effort. The lubricant, i.e., the oil, in friction contact is needed only for wetting but not for cooling. As a result, the required quantities of lubricant are much smaller, and an active lubricant supply due to pressure lubrication or the like is no longer necessary. It is sufficient to lubricate the friction contacts solely by dipping the planetary gear bearing axis, including the friction bearing and planet wheel, into the immersion bath, i.e., the oil sump of the gearset. This provides a sufficient inlet. Moreover, due to the elimination of the active lubricant supply, the susceptibility to faults in the planetary gearset also decreases, while the operational reliability and system availability increase. If one or multiple lubricant receiving spaces is/are implemented by a corresponding arrangement of multiple sleeves directly in the sliding area, a secure friction bearing lubrication is ensured. This is, of course, also ensured if only one single sleeve is provided, since, as described above, a low heat development exists, in particular if the material pairing described is used. However, if the latter is not used, and if known material pairings are utilized, an active lubricant supply may, of course, be provided.

If multiple sleeves are situated on the bearing axis, the bearing axis may have an axial bore and a radial bore guided therein, which opens into a lubricant receiving space. A lubricant inflow may thus take place in the bearing area not only on the front side but also more or less via the bearing axis itself, it being also possible to implement this inflow either via an active lubricant supply or solely by passing through the lubricant sump.

To also axially support the planet wheel for absorbing, e.g., axial forces resulting from the gearing, at least one axial friction bearing may be provided, via which the planet wheel is mounted against the planet carrier, the axial bearing including at least one axial disk, which is either connected to the planet wheel and runs on the planet carrier or is connected to the planet carrier and runs on the planet wheel, and has a surface having a domed profile, at least in sections, on its side facing the planet carrier or the planet wheel.

According to the present invention, this axial friction bearing is also provided with a surface having a domed profile, which is designed and positioned in such a way that, in the event of a slight tilting of the planet wheel relative to the bearing axis, no increased and wear-conducive edge pressure also exists in this friction bearing area. After all, if the planet wheel tilts minimally, a certain tilting moment also exists in the axial friction bearing. However, it is compensated by the corresponding surface profiling, which means that excess edge pressure, which would be conducive to wear, also does not exist in the axial friction bearing area.

It is particularly advantageous in this case, if the axial disk also have an antifriction layer in the form of a deposited hard material layer, which runs on an antifriction layer formed on the planet carrier or the planet wheel in the form of a hardened surface layer. This means that the corresponding, advantageous material pairing of hard material layer/hardened surface layer according to the present invention, which is wear-resistant, is also provided on the axial bearing side. In combination with the edge recess according to the present invention via the domed surface, an extreme wear resistance consequently also results in the axial friction bearing area, whether during normal sliding operation or with respect to reducing excess edge pressures.

The surface having a domed profile may have a homogeneous dome shape, i.e., a dome shape having a constant radius, which is, of course, very large. Alternatively, the dome shape may have a logarithmic profile, i.e., a recess exists primarily in the area of the surface edge, i.e., in the edge areas of the friction bearing, while the area therebetween is almost completely cylindrical. This cylindrical area should exist over at least half, preferably over at least two-thirds, of the length, so that a greater decrease in diameter exists only in the edge area.

The hard material layer should have a hardness of at least 800 HV, in particular at least 1,000 HV to 4,000 HV and preferably 1,100 HV to 3,000 HV, while the hardened surface layer should achieve a hardness of at least 45 HRC, in particular at least 53 HRC and preferably 55 HRC to 65 HRC. The hard material layer should have a surface roughness Rz of less than 1.5, in particular at least 1. The surface roughness of the assigned hardened surface layer is also preferably less than Rz=2, preferably less than Rz=1. The layer thickness of the hard material layer should be preferably <20 μm, preferably in the range of 1 μm to 10 μm. The thickness of the hardened surface layer should be at least as thick, if not thicker, than the hard material layer, since it is slightly softer and consequently subjected to a slightly greater load.

In addition to the planetary gear bearing system itself, the present invention furthermore relates to a planetary gearset, which includes a planetary gear bearing system of the type described. If multiple planet wheels are provided on the planetary gearset side, they are, of course, provided in a corresponding arrangement on a shared planet carrier or—if two disk-shaped planet carriers are provided—on corresponding bearing axes thereof. Each of these bearing systems is designed or constructed in the manner according to the present invention, both geometrically and tribologically. The same applies to the particular separate axial bearings of the individual planet wheels.

BRIEF DESCRIPTION

One exemplary embodiment of the present invention is illustrated in the drawings and explained in greater detail below.

Figure 2:
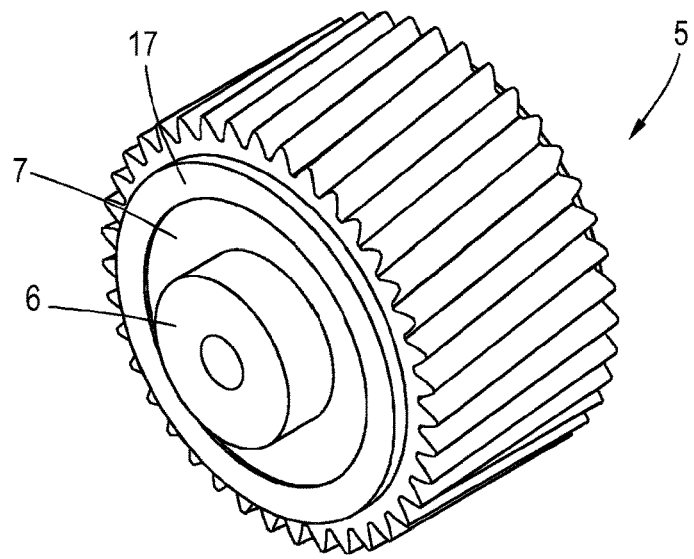
Figure 3:
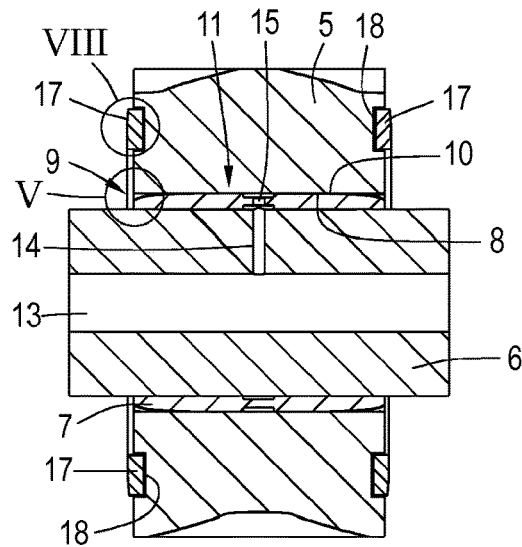
Figure 4:
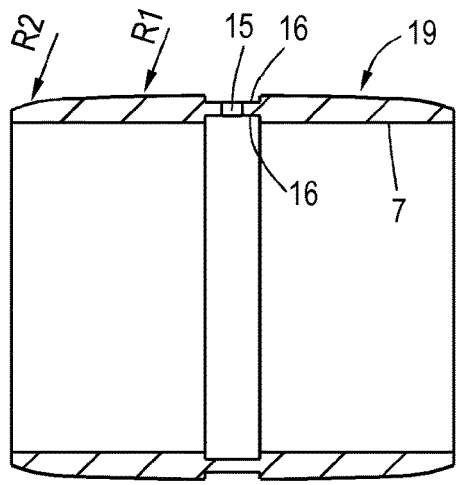
Figure 5:
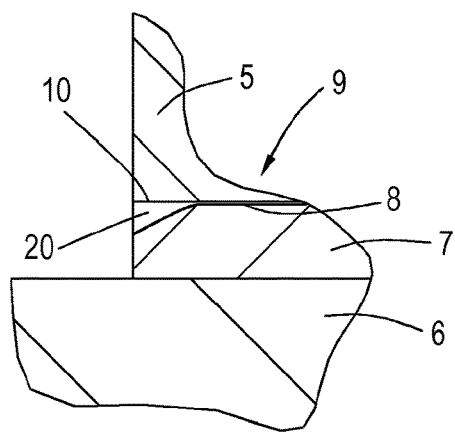
Figure 6:
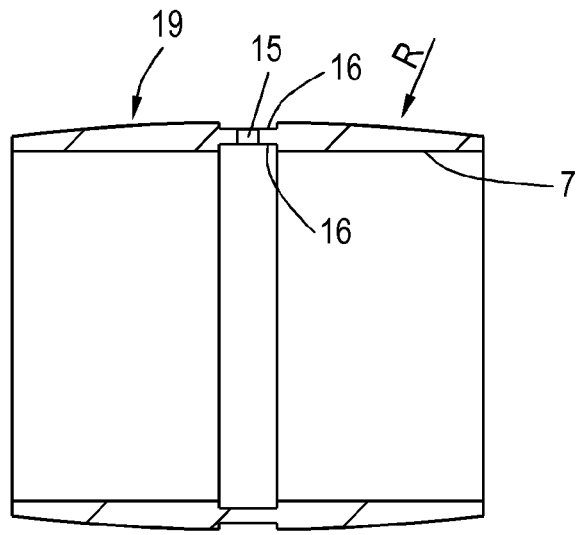
Figure 7:
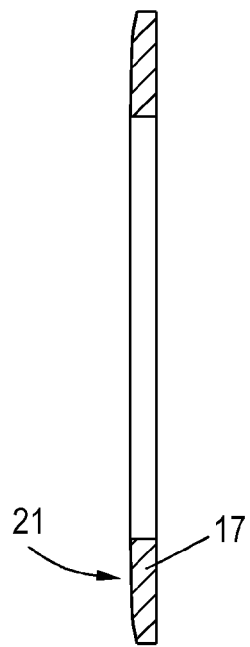
Figure 8:
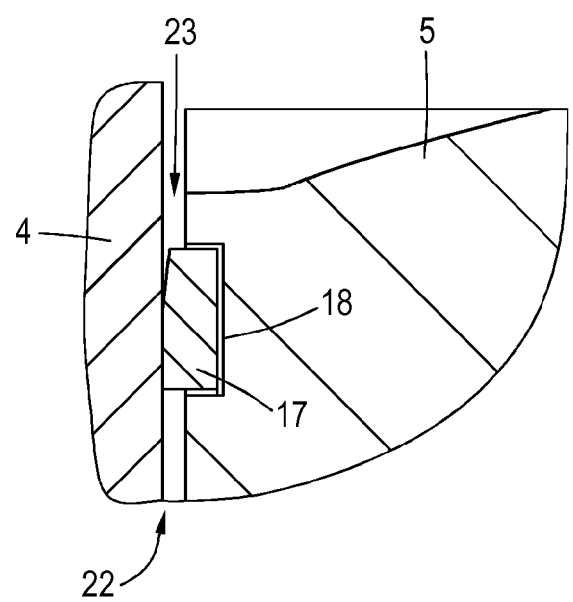
Figure 9:
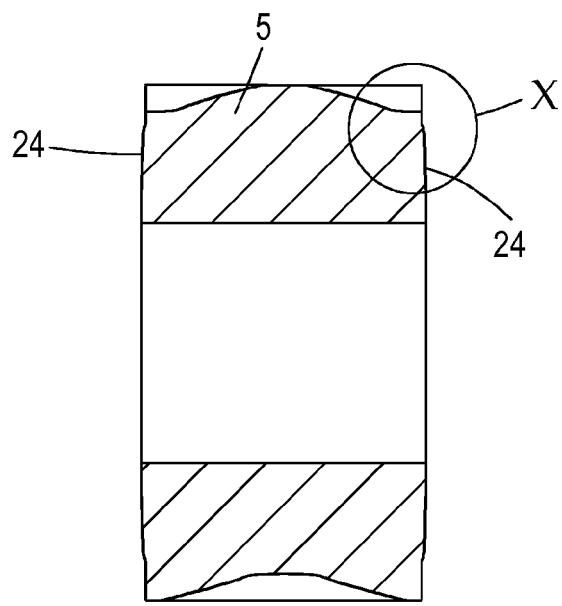
Figure 10:
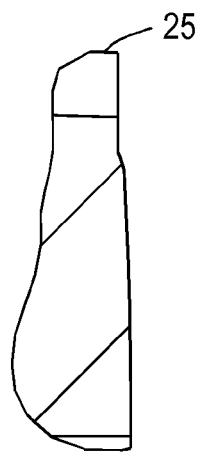
Figure 11:
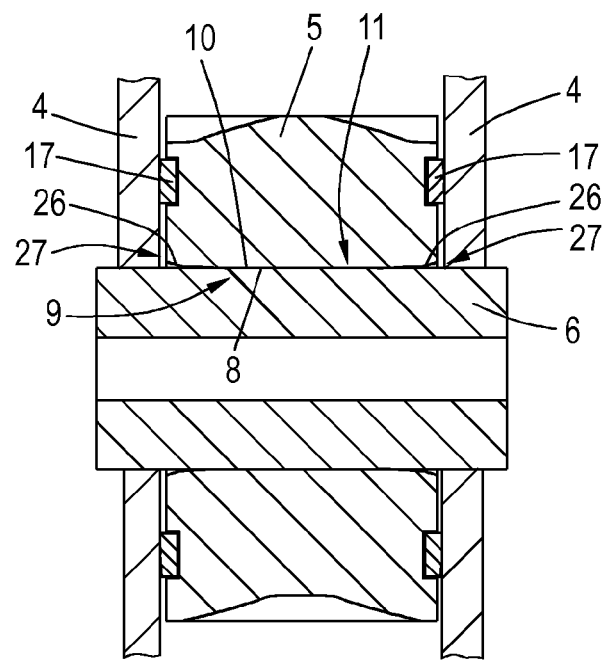
Figure 12:
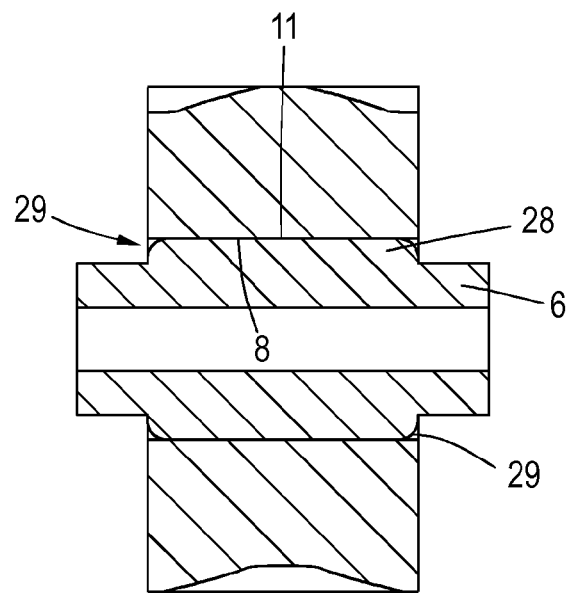
Figure 13:
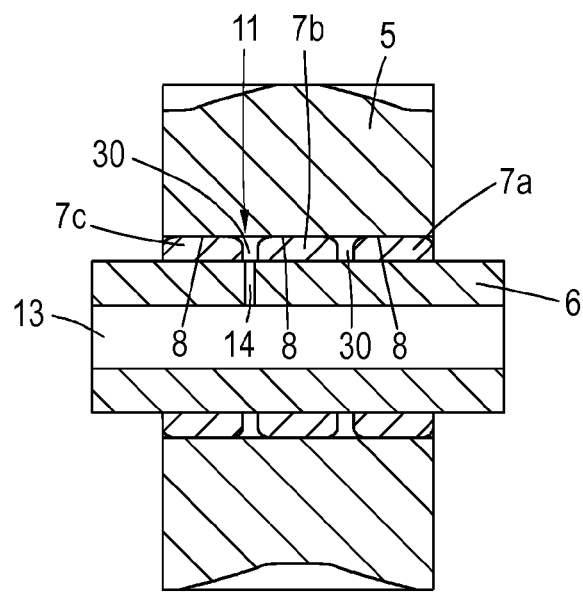

FIG. 1 shows a schematic view of a planetary gearset according to the present invention;
FIG. 2 shows a planet wheel, including the bearing axis;
FIG. 3 shows a sectional view of the bearing system according to FIG. 2;
FIG. 4 shows an enlarged sectional view of a sleeve fastened to the bearing axis, including the profiled surface;
FIG. 5 shows an enlarged detailed view of area V from FIG. 3;
FIG. 6 shows an enlarged sectional view of a sleeve fastened to the bearing axis, in a second specific embodiment;
FIG. 7 shows a sectional view of an axial bearing disk;
FIG. 8 shows an enlarged sectional view of area VIII from FIG. 3;
FIG. 9 shows a sectional view of a planet wheel having a domed front surface;
FIG. 10 shows an enlarged sectional view of area X from FIG. 9;
FIG. 11 shows a sectional view of a bearing system in a second specific embodiment;
FIG. 12 shows a sectional view of a bearing system in a third specific embodiment;
FIG. 13 shows a bearing system in a fourth specific embodiment.

DETAILED DESCRIPTION

FIG. 1 shows a planetary gearset 1 according to the present invention, including a total of three planetary gear bearing systems 2 according to the present invention. Planetary gearset 1 includes an annulus wheel 3, which has an inner gearing, as well as a planet carrier 4, which has three planet wheels 5, which are rotatably supported thereon and mesh with annulus wheel 3 in the known way via their outer gearings. Each planet wheel 5 is supported in the manner according to the present invention on a bearing axis 6, which is fixedly connected to planet carrier 4. The planetary gearset is driven via a sun wheel, which meshes with planet wheels 5 and is not illustrated in greater detail.

FIGS. 2 and 3 show a first specific embodiment of a planet wheel bearing. FIG. 2 shows planet wheel 5 as well as bearing axis 6, which is fastened to planet carrier 4 known from FIG. 1 in a way which is known per se. A sleeve 7 is fastened to bearing axis 6. Sleeve 7 has a first antifriction layer on its outside, for example in the form of a hard material layer 8 deposited thereon, for example a layer made by the applicant known under the name, "Triondur®." This layer, which is deposited, for example with the aid of PVD or PACVD methods, has a hardness of at least 800 HV, in particular at least 1,000 HV to 4,000 HV, preferably 1,100 HV to 3,000 HV. It is the one friction partner of a friction bearing 9. The other friction partner is the second antifriction layer in the form of a hardened surface layer 11, which is produced on the inner surface of bore 10 of planet wheel 5 and which is manufactured by hardening methods which are known per se. The hardened surface layer has a hardness of at least 45 HRC, preferably at least 53 HRC, in particular at least 55 HRC to 65 HRC. Friction bearing 9 in this case is thus formed with the aid of sleeve 7, including its first antifriction layer in the form of hard material layer 8, as well as planet wheel 5, including its second antifriction layer in the form of hardened surface layer 11. Since the two friction partners or antifriction layers are extremely hard, negligible wear occurs, compared to previously known friction bearing systems in the area of planetary gear bearings. Planet wheel 5 itself is made, for example, of rolling bearing steel, which is capable of extremely good hardening in the known way. Sleeve 7 may also be made, for example, of rolling bearing steel. However, the applied hard material layer is important, as described here. At this point, however, it should be noted that layering systems other than the ones described above may also be selected.

If the layering system described above is used, in particular, no active lubrication of friction bearing 9, i.e., of the sliding area, is necessary. Instead, the oil supply is sufficient, which is present when planet wheel 5, including bearing axis 6, passes through an oil sump during a rotation of planet carrier 4; sufficient lubricant for antifriction lubrication is scooped up hereby.

To improve the lubrication, it is possible to supply lubricant from the inside via a central bore 13 of bearing axis 6 and a bore 14 running radially thereto. Bore 14 continues via a bore 15 in sleeve 7, upstream and downstream extensions 16, which form the lubricant reservoirs, being assigned to bore 15. Since lubricant may also collect in the area of bore 13, a corresponding supply to friction bearing 9 may also take place hereby, although this is not absolutely necessary.

Two axial bearing disks 17 are furthermore provided on both sides of planet wheel 5, in receptacles 18 introduced into the front side of planet wheel 5. Planet wheel 5 is supported via these axial disks 17, for example on particular planet carrier 4, which in this design is provided on one wheel side, the two planet carriers 4 being connected via bearing axis 6. An axially supporting axial friction bearing is thus implemented. The same antifriction layer system as in the area of friction bearing 9 may also be implemented on this axial friction bearing, although this is not required. Axial disk 17 preferably has a corresponding hard material layer, it being possible to use the same hard material utilized for forming hard material layer 8. The corresponding counter-bearing surface on planet carrier 4 is also a hardened surface layer, and planet carrier 4 may also be made, for example, of rolling bearing steel or the like, so that the hardening thereof over a large surface area is also readily possible. This means that corresponding friction conditions, which require very little lubrication, also develop in the area of this axial bearing. Once again, it is sufficient to simply pass through the oil bath for the purpose of securing the supply of lubricant.

In the planetary gear bearing system according to the present invention, it is important to take precautions for reducing or avoiding a possible edge pressure in the case of an axial load acting upon planet wheel 5 and thus an existing tilting moment. A load of this type occurs, in particular, because the planet wheel has a helical gearing, which meshes with a corresponding helical gearing on annulus wheel 3. To avoid an edge pressure of this type, surface 19 of sleeve 7, which carries hard material layer 8, is profiled in the illustrated example; see FIG. 4. It is apparent that the wall thickness decreases, particularly in the edge area. The profiling here is logarithmic, which means that the domed surface in the illustrated example has two radii R1 and R2 of different sizes. Alternatively, a homogeneous dome shape having one uniform radius R may also be used; see sleeve 7 shown in FIG. 6.

FIG. 5 shows an enlarged detailed view of the planetary gear bearing system from FIG. 3 in area V. It should be assumed that the sleeve illustrated in FIG. 3 corresponds to the sleeve according to FIG. 4. It is apparent that a circumferential gap 20, which increases slightly from the inside to the outside and which is drawn exaggeratedly large for illustrative purposes, consequently results, particularly in the edge area. The decreasing surface of sleeve 7, and cylindrical lateral surface 10 of planet wheel 5, are situated opposite each other. If planet wheel 5 were now to be subjected to an axial load and tilt slightly, an increasing surface pressure would nevertheless not occur, since the two edges are spaced a sufficient distance apart.

If planet wheel 5 were to tilt, the two axial disks 17 would also be tilted accordingly. If the latter rest conductively against planet carrier 4, an increased edge pressure would exist there as well. To also avoid a corresponding, wear-conducive, high edge pressure in this location (see FIG. 7), corresponding precautions are also taken on each axial disk 17. Surface 21, which carries, for example, the hard material layer, is also profiled in this location, for example in an equally logarithmic form, according to the embodiment on sleeve 4, or using a homogeneous dome shape. It is also apparent that, in this location, the disk thickness decreases toward the edge.

FIG. 8 shows an enlarged detailed view of area VIII, which shows installed axial disk 17. The latter, which forms an axial friction bearing 22, rests against planet carrier 4, which has, for example, a hardened surface layer. However, a circumferential gap 23, which opens toward the outside and which is also drawn exaggeratedly large here, is also apparent. If planet wheel 5 were now to tilt, axial disk 17 would also tilt, but its edge would not rest against planet carrier 4. Consequently, an increased, wear-conducive edge pressure does not exist here either.

While the specific embodiment described above shows an axial bearing 22, in which an axial disk 17 having a surface profiling is installed, it is possible to dispense with an axial disk 17 of this type and use planet wheel 5 itself accordingly as the friction bearing element. For this purpose, the particular front surface of planet wheel 5 may have a corresponding antifriction layer, for example the hard material layer described above. To avoid an edge pressure in the event of tilting, in particular front surface 24 is profiled accordingly in this location, as shown in FIGS. 9 and 10. It is apparent that in particular front surface 24 is recessed in the radially outer area, and a logarithmic profile or a dome shape having an unchangeable radius may also be provided here. If a slight tilt occurs, no increased edge pressure sets in here either. The area of outer thread 25 is also slightly recessed, since it must, of course, be ensured in the event of tilting that outer thread 25 does not rest on planet carrier 4.

FIG. 11 shows one embodiment of a planetary gear bearing system, in which planet wheel 5 is mounted on bearing axis 6 via friction bearing 9 without a sleeve being connected therebetween. It should again be assumed that bearing axis 6 carries the hard material layer, while the planet wheel is provided with a hardened surface layer 11 on the inside.

Two separate planet carriers 4 are also shown, which are connected via bearing axis 6.

In this embodiment, inner lateral surface 10 of the planet wheel bore is profiled accordingly to avoid an increased edge pressure. A logarithmic dome shape or one having a constant radius may be present. As shown in an exaggerated manner, it is apparent that the two edges 26 are recessed, so that a particular, narrow gap 27 results, which facilitates a tilt of planet wheel 5 without edge pressure.

The two axial disks 17 shown here are also designed in the corresponding manner as in the above specific embodiment.

FIG. 12 shows another specific embodiment of a planetary gear bearing system, only planet wheel 5 and bearing axis 6 being illustrated here for the sake of simplicity. Of course, one or two planet carriers are also provided here, as are corresponding axial bearing disks 17, etc.

In this embodiment, bearing axis 6 includes a radial bearing collar 28, which carries, for example, hard material layer 8. Its surface, in turn, is profiled, namely like surface 19 of the particular sleeve according to FIGS. 4 and 6, i.e., either logarithmically or having a homogeneous radius. This results in the fact that the two edges 29, in turn, are significantly recessed, so that a corresponding gap forms. If planet wheel 5 having hardened surface layer 11 tilts, an increased edge pressure is avoided here as well.

Lastly, FIG. 13 shows another specific embodiment, in which planet wheel 5—like the previously described specific embodiment—is not deformed, i.e. has a cylindrical inner lateral surface which has hardened surface layer 11. Instead of one single sleeve, three separate sleeves 7a, 7b and 7c are provided here. Each of these sleeves 7a, 7b, 7c has a hard material layer 8 by way of example. Each of individual sleeves 7a, 7b, 7c has a correspondingly profiled surface, so that the particular edges are also recessed here. Sleeves 7a, 7b, 7c are situated a distance apart, so that a lubricant receiving space 30 is formed between each of the two sleeves. Radial bore 14, which opens into bore 13 of bearing axis 6, opens into one of these lubricant receiving spaces 30 for the purpose of supplying lubricant from the inside. An additional radial bore of this type may, of course, also be provided in the specific embodiments according to FIGS. 11 and 12.

Planet wheel 5 may be made of rolling bearing steel or case hardening steel, for example 18CrNiMo7-6. The particular sleeve, which forms the substrate for a hard material layer which may be used, or which is hardened, may also be made of rolling bearing steel or thermochemically treated case hardening steel (e.g., 16MnCr5), although tempering steel (e.g., 42CrMo4), full-hardened steel (e.g., 100Cr6) or nitriding steel may also be used. The bearing axis may be made of any sufficiently hardened steel, as may the planet carrier, which, however, may also be manufactured from casting materials such as GG70, GG50 or GG40.

LIST OF REFERENCE NUMERALS 1 planetary gearset
2 planetary gear bearing system
3 annulus wheel
4 planet carrier
5 planet wheel
6 bearing axis
7 sleeve
8 hard material layer
9 friction bearing
10 inner surface of the bore
11 hardened surface layer
12 —
13 central bore
14 radial bore
15 bore in sleeve
16 extension
17 axial bearing disk
18 receptacle
19 surface of the sleeve
20 gap
21 surface of the axial disk
22 axial friction bearing
23 gap
24 front surface
25 outer thread
26 edge
27 gap
28 bearing collar
29 edge
30 lubricant receiving space

The invention claimed is:

1. A planetary gear bearing system comprising
a planet carrier on which is provided a fixed bearing axis;
a planet wheel rotatably mounted on the bearing axis via a friction bearing;
the friction bearing including a first antifriction layer provided on a bearing axis side of the friction bearing and a second antifriction layer provided on a planet wheel side of the friction bearing;
wherein one of the first and second antifriction layers is produced on a surface having a dome profile, at least in sections, in a sliding area of said one of the first and second antifriction layers, one of the first antifriction layer and the second antifriction layer being a deposited hard material layer having a hardness of at least 800 HV, the other of the first antifriction layer and the second antifriction layer being a hardened surface layer having a hardness of at least 45 HRC, the hardened surface layer being at least as thick as the hard material layer and softer than the hard material layer.

2. The planetary gear bearing system as recited claim 1, wherein
the surface is formed directly on the bearing axis or the planet wheel, or on at least one sleeve situated on the axis side or the wheel side.

3. The planetary gear bearing system as recited in claim 2, wherein
two or more sleeves are provided axially one after the other, which are spaced a distance apart to form at least one lubricant receiving space, and/or which have a section with a reduced wall thickness.

4. The planetary gear bearing system as recited in claim 3,
wherein multiple sleeves of the two or more sleeves are situated on the bearing axis,
wherein the bearing axis has an axial bore and a radial bore, and wherein the radial bore opens into the at least one lubricant receiving space.

5. The planetary gear bearing system as recited in claim 1,
wherein at least one axial friction bearing is provided, via which the planet wheel is supported against the planet carrier, the axial friction bearing including at least one axial disk,
wherein the at least one axial disk is either connected to the planet wheel and runs on the planet carrier or is connected to the planet carrier and runs on the planet wheel,
wherein the at least one axial disk includes a surface having a domed profile, at least in sections, on its side facing the planet carrier or the planet wheel.

6. The planetary gear bearing system as recited in claim 5,
wherein the at least one the axial disk has an antifriction layer in the form of a deposited hard material layer, which runs on an antifriction layer formed on the planet carrier or the planet wheel in the form of a hardened surface layer.

7. The planetary gear bearing system as recited in claim 1, wherein one or more front surfaces of the planet wheel include a surface having a dome profile, at least in sections.

8. The planetary gear bearing system as recited in claim 1, wherein the surface having the dome profile is a homogeneous dome, or has a logarithmic profile.

9. A planetary gearset, including a planetary gear bearing system as recited in claim 1.

10. The planetary gear bearing system as recited in claim 1, wherein an outer surface of the first antifriction layer contacts an inner surface of the second antifriction layer.

* * * * *